United States Patent
Ano

(10) Patent No.: US 10,739,970 B2
(45) Date of Patent: Aug. 11, 2020

(54) DISPLAY SYSTEM, DISPLAY DEVICE, AND METHOD FOR CONTROLLING DISPLAY DEVICE

(71) Applicant: SEIKO EPSON CORPORATION, Tokyo (JP)

(72) Inventor: Takahiro Ano, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 21 days.

(21) Appl. No.: 16/257,115

(22) Filed: Jan. 25, 2019

(65) Prior Publication Data

US 2019/0235736 A1 Aug. 1, 2019

(30) Foreign Application Priority Data

Jan. 26, 2018 (JP) .................................. 2018-011303

(51) Int. Cl.
*G06F 3/0484* (2013.01)
*G06F 9/30* (2018.01)
*H04N 5/74* (2006.01)

(52) U.S. Cl.
CPC ...... *G06F 3/04845* (2013.01); *G06F 9/30003* (2013.01); *H04N 5/74* (2013.01); *G06T 2200/24* (2013.01)

(58) Field of Classification Search
None
See application file for complete search history.

(56) References Cited

U.S. PATENT DOCUMENTS

2005/0146751 A1* 7/2005 Haga ..................... G06F 3/1208
358/1.18
2012/0011435 A1 1/2012 Koarai et al.

FOREIGN PATENT DOCUMENTS

| JP | 2010-171780 A | 8/2010 |
| JP | 2012-018631 A | 1/2012 |
| JP | 2012-194324 A | 10/2012 |
| JP | 2016-218495 A | 12/2016 |

* cited by examiner

*Primary Examiner* — Tuan S Nguyen
(74) *Attorney, Agent, or Firm* — Oliff PLC

(57) ABSTRACT

A display device includes: a communication unit; a storage unit; a display unit which is enabled to display an image based on image information, when the storage unit stores the image information; and a control unit. The control unit causes the communication unit to execute an operation to transmit first information used to give an instruction to display the image, to the information processing device, and causes the storage unit to store the image information, when the communication unit receives a first signal. The control unit causes the communication unit to execute an operation to transmit a second signal which prompts a display corresponding to the first information to the information processing device, after the storage unit stores the image information. The control unit causes the display unit to display the image when the communication unit receives a third signal which gives an instruction to display the image.

15 Claims, 5 Drawing Sheets

DISPLAY SYSTEM, DISPLAY DEVICE, AND METHOD FOR CONTROLLING DISPLAY DEVICE

The entire disclosure of Japanese Patent Application No. 2018-011303, filed Jan. 26, 2018 is expressly incorporated by reference herein.

BACKGROUND

1. Technical Field

The present invention relates to a display system, a display device, and a method for controlling a display device.

2. Related Art

JP-A-2012-194324 discloses a display device which changes a display image in response to an instruction from a PC (personal computer).

The display device as disclosed in JP-A-2012-194324 may take time to complete a display corresponding to an instruction after receiving the instruction from an information processing device such as a PC.

SUMMARY

An advantage of some aspects of the invention is that a technique that can reduce the time taken by a display device to complete a display corresponding to an instruction after receiving the instruction from an information processing device is provided.

An aspect of the invention is directed to a display system including an information processing device and a display device which communicates with the information processing device. The display device includes: a communication unit which communicates with the information processing device; a storage unit; a display unit which is enabled to display an image based on image information, on a display surface, when the storage unit stores the image information; and a control unit which controls the communication unit, the storage unit, and the display unit. The information processing device transmits a first signal which requests first information used to give an instruction to display the image, to the display device. The control unit causes the communication unit to execute an operation to transmit the first information to the information processing device and also causes the storage unit to store the image information, when the communication unit receives the first signal. The control unit causes the communication unit to execute an operation to transmit a second signal which prompts a display corresponding to the first information, to the information processing device, after the storage unit stores the image information. The information processing device executes the display corresponding to the first information when the information processing device receives the first information and the second signal. The information processing device transmits a third signal which gives an instruction to display the image, to the display device, in response to an operation on the display corresponding to the first information. The control unit causes the display unit to execute an operation to display the image on the display surface when the communication unit receives the third signal.

This configuration enables the information processing device to accept an operation to give an instruction to display an image, after the storage unit stores image information and the display unit is enabled to display an image based on the image information, on the display surface.

Therefore, the time taken by the display device to complete a display corresponding to an instruction after receiving the instruction from the information processing device can be made shorter than in a configuration where an image based on image information is displayed on the display surface after the storage unit stores the image information, following the acceptance of the operation by the information processing device.

Another aspect of the invention is directed to a display device including: a communication unit which communicates with an information processing device; a storage unit; a display unit which is enabled to display an image based on image information, on a display surface, when the storage unit stores the image information; and a control unit which controls the communication unit, the storage unit, and the display unit. The control unit causes the communication unit to execute an operation to transmit first information used to give an instruction to display the image, to the information processing device, and also causes the storage unit to store the image information, when the communication unit receives a first signal which requests the first information from the information processing device. The control unit causes the communication unit to execute an operation to transmit a second signal which prompts a display corresponding to the first information to the information processing device, after the storage unit stores the image information. The control unit causes the display unit to execute an operation to display the image on the display surface when the communication unit receives a third signal which gives an instruction to display the image transmitted from the information processing device in response to an operation on the display corresponding to the first information.

This configuration enables the information processing device to accept an operation to give an instruction to display an image, after the storage unit stores image information and the display unit is enabled to display an image based on the image information, on the display surface.

Therefore, the time taken by the display device to complete a display corresponding to an instruction after receiving the instruction from the information processing device can be made shorter than in a configuration where an image based on image information is displayed on the display surface after the storage unit stores the image information, following the acceptance of the operation by the information processing device.

In the aspect of the display device, it is desirable that the image information is one of a plurality of pieces of image information, and that the control unit causes the communication unit to execute the operation to transmit the first information to the information processing device with respect to the plurality of pieces of image information and also causes the storage unit to store the plurality of pieces of image information, when the communication unit receives the first signal for the plurality of pieces of image information from the information processing device.

This configuration can reduce the time taken by the display device to complete a display corresponding to an instruction after receiving the instruction from the information processing device, even in the state where a display target image is selected from a plurality of images.

In the aspect of the display device, it is desirable that the control unit causes the communication unit to execute the operation to transmit the second signal to the information processing device with respect to image information stored in the storage unit, of the plurality of pieces of image information, even when there is image information that is not stored in the storage unit, of the plurality of pieces of image information, while the plurality of pieces of image information is being stored in the storage unit.

This configuration enables acceptance of an operation to give an instruction to display an image with respect to images that are enabled to be displayed, even when not all of the plurality of images are enabled to be displayed.

In the aspect of the display device, it is desirable that the information processing device transmits the third signal to the display device when a predetermined position is operated in the state where the display corresponding to the first information is executed at the predetermined position, and that the information processing device does not transmit the third signal to the display device when the predetermined position is operated in the state where the display corresponding to the first information is not executed at the predetermined position.

This configuration can restrain the transmission of the third signal giving an instruction to display the image with respect to an image that is not enabled to be displayed.

In the aspect of the display device, it is desirable that the control unit acquires the image information from an external storage device and causes the storage unit to store the image information acquired from the external storage device, when the communication unit receives the first signal.

This configuration enables displaying an image corresponding to image information stored in the external storage device, on the display surface.

Another aspect of the invention is directed to a method for controlling a display device which has a storage unit and which is enabled to display an image based on image information, on a display surface, when the storage unit stores the image information. The method includes: when a first signal which requests first information used to give an instruction to display the image is received from an information processing device, transmitting the first information to the information processing device and causing the storage unit to store the image information; transmitting a second signal which prompts a display corresponding to the first information to the information processing device, after the storage unit stores the image information; and displaying the image on the display surface when a third signal which gives an instruction to display the image transmitted from the information processing device in response to an operation on the display corresponding to the first information is received.

This configuration can reduce the time taken by the display device to complete a display corresponding to an instruction after receiving the instruction from the information processing device.

BRIEF DESCRIPTION OF THE DRAWINGS

The invention will be described with reference to the accompanying drawings, wherein like numbers reference like elements.

DESCRIPTION OF EXEMPLARY EMBODIMENTS

Figure 1:
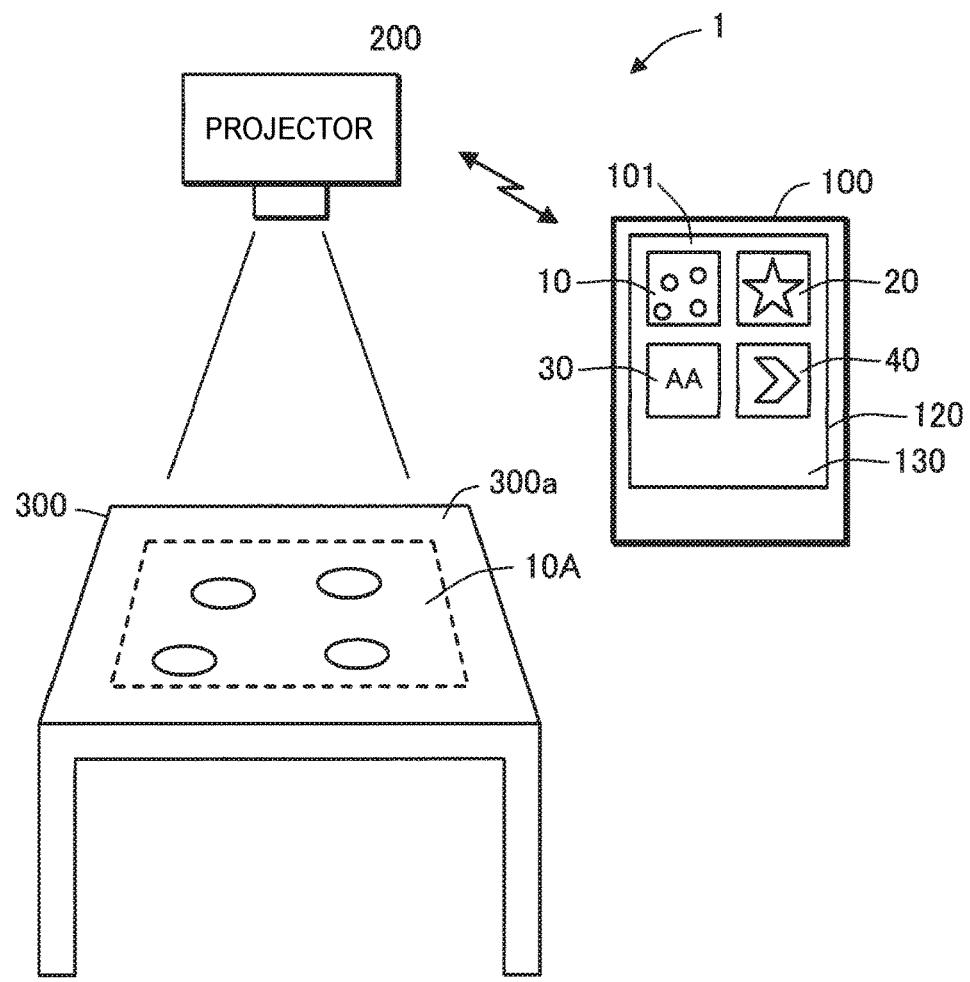
FIG. 1 shows a display system 1 according to a first embodiment.

Hereinafter, embodiments of the invention will be described with reference to the drawings. In the drawings, the dimension and scale of each component are different from the actual dimension and scale, where appropriate. The embodiments described below are specific preferable examples of the invention. Therefore, in the embodiments, various technical limitations are given. However, the scope of the invention is not limited to the embodiments unless stated otherwise in the description below.

First Embodiment

FIG. 1 shows a display system 1 according to a first embodiment.

First, an outline of the display system 1 is described. The display system 1 includes a terminal device 100 and a projector 200 which projects an image, for example, an image for presentation effect (hereinafter also referred to as "content image").

The terminal device 100 is a device having a communication function, such as a smartphone. The terminal device 100 is an example of an image processing device. The terminal device 100 stores a content switching application to switch a content image projected by the projector 200. The content image is an example of an image.

The terminal device 100 starts up the content switching application and then acquires content information from the projector 200. The content information is used to generate a thumbnail image of a content image that can be projected by the projector 200. The thumbnail image is also a preview image of the content image.

In this embodiment, the terminal device 100 acquires first content information to generate a thumbnail image 10, second content information to generate a thumbnail image 20, third content information to generate a thumbnail image 30, and fourth content information to generate a thumbnail image 40, from the projector 200. The content information (each of the first to fourth content information) is an example of first information used to give an instruction to display an image.

The terminal device 100 generates the thumbnail image 10 based on the first content information. The terminal device 100 generates the thumbnail image 20 based on the second content information. The terminal device 100 generates the thumbnail image 30 based on the third content information. The terminal device 100 generates the thumbnail image 40 based on the fourth content information. The thumbnail image (each of the thumbnail images 10 to 40) is an example of a display corresponding to the first information. The terminal device 100 displays the thumbnail images 10 to 40.

The projector 200 is an example of a display device. The projector 200 projects and displays, for example, a content image (for example, an image for birthday 10A) on a table surface 300a of a table 300 in a restaurant. The image for birthday 10A corresponds to the thumbnail image 10. The content image is not limited to the image for birthday and can be changed suitably. The table surface 300a is an example of a display surface. The display surface is not limited to the table surface 300a and can be changed suitably. The display surface is not included in the display unit. The projector 200 can project various content images.

For example, it is now assumed that a birthday celebration event is held at a restaurant and that the thumbnail image 10 is operated (for example, with a touch operation) at the timing when the image for birthday 10A should be displayed in the course of the event. In this case, the terminal device 100 transmits to the projector 200 a notification (also referred to as "display notification") which gives an instruction to display the image for birthday 10A corresponding to the thumbnail image 10, in response to the operation on the thumbnail image 10. The display notification is an example of a third signal which gives an instruction to display an image.

The projector 200 receives the display notification and then projects the image for birthday 10A (content image) designated by the display notification, onto the table surface 300a.

Figure 3:
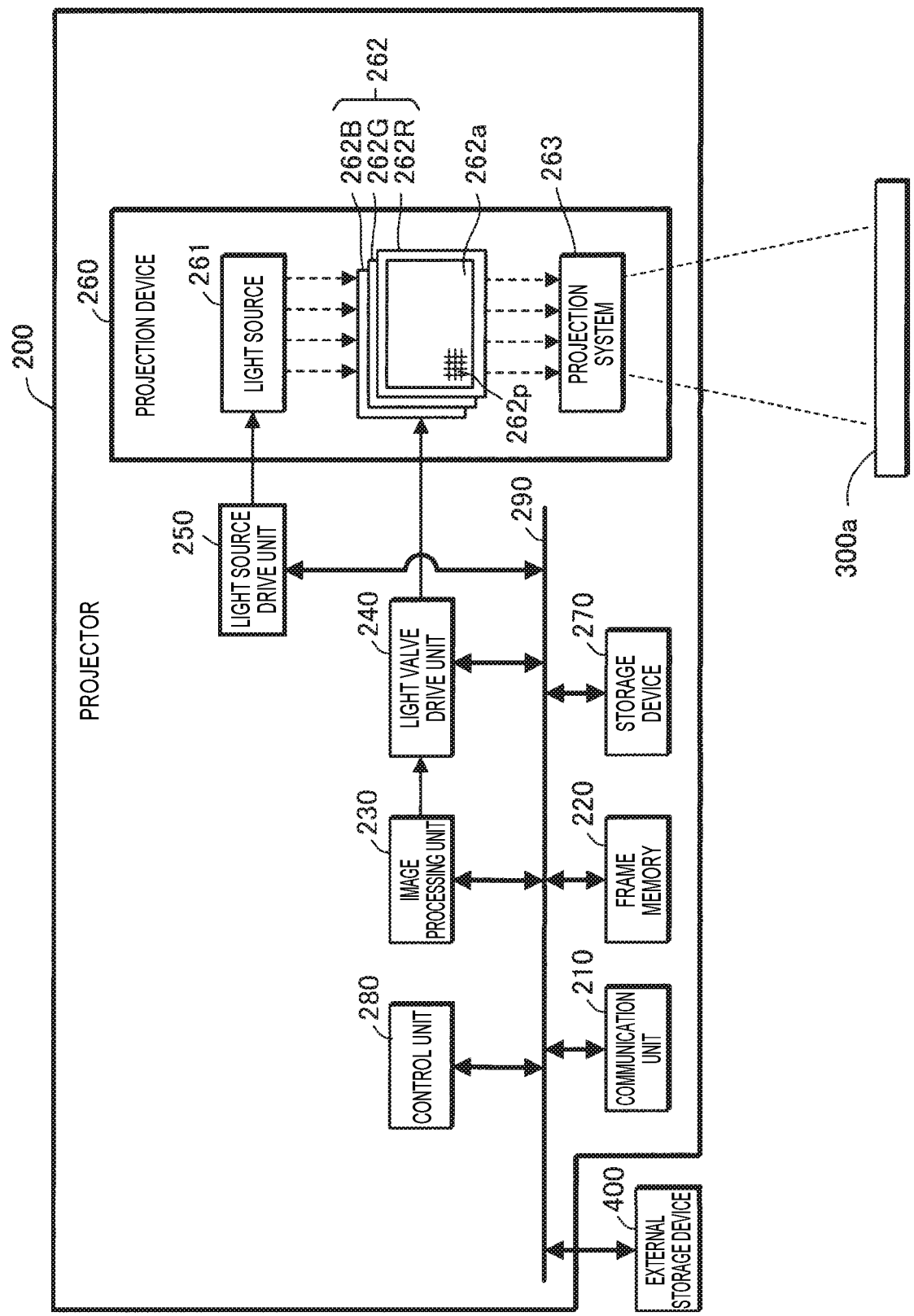
FIG. 3 shows an example of a projector 200.

Here, the projector 200 is enabled to project a content image corresponding to image information onto the table surface 300a after loading the image information representing the content image into a frame memory 220 (see FIG. 3).

If the projector 200 loads the image information into the frame memory 220 after receiving the display notification and subsequently displays the content image corresponding to the image information, it takes time until the image for birthday 10A is displayed after the thumbnail image 10 is operated. Therefore, the actual display timing of the image for birthday 10A tends to be delayed from the timing when the image for birthday 10A should be displayed in the event. This may reduce the presentation effect of the image for birthday 10A.

Thus, in this embodiment, an operation on the thumbnail image is enabled in the terminal device 100 after the projector 200 loads the image information into the frame memory 220. Subsequently, the content image is enabled to be displayed with little delay time in response to the operation on the thumbnail image. Here, loading the image information into the frame memory 220 means storing the image information into the frame memory 220.

Next, details of the display system 1 will be described.

Figure 2:
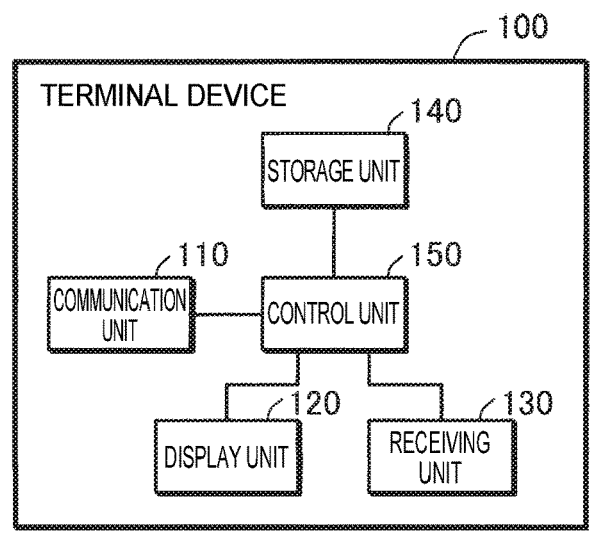
FIG. 2 shows an example of a terminal device 100.

FIG. 2 shows an example of the terminal device 100. The terminal device 100 includes a communication unit 110, a display unit 120, a receiving unit 130, a storage unit 140, and a control unit 150.

The communication unit 110 communicates with the projector 200. For example, the communication unit 110 wirelessly communicates with the projector 200.

The communication unit 110 transmits a request signal which requests content information, to the projector 200. The request signal is an example of a first signal which request content information. The communication unit 110 receives content information corresponding to the request signal, from the projector 200. On receiving the content information, the terminal device 100 generates thumbnail image information representing a thumbnail image, using the content information.

After receiving the content information, the communication unit 110 receives a loading completion signal indicating that the projector 200 has loaded (stores) image information corresponding to the content information into the frame memory 220. In response to the reception of the loading completion signal, the terminal device 100 displays the thumbnail image based on the thumbnail image information corresponding to the content information. The loading completion signal is an example of a second signal which prompts a display corresponding to the first signal.

If a thumbnail image is operated (for example, with a touch operation), the communication unit 110 transmits a display notification corresponding to the operated thumbnail image, to the projector 200. If the projector 200 receives the display notification, the projector 200 projects and displays the content image corresponding to the image information already loaded in the frame memory 220.

The display unit 120 displays various kinds of information. The display unit 120 displays, for example, a thumbnail display image 101 (see FIG. 1) in which the thumbnail images 10 to 40 are embedded.

The receiving unit 130 is, for example, a touch panel. The receiving unit 130 receives an operation (touch operation) on one of the thumbnail images 10 to 40 by the user of the terminal device 100.

The storage unit 140 is a computer-readable recording medium. The storage unit 140 stores a program which prescribes operations of the terminal device 100 (in this embodiment, the content switching application), and various kinds of information.

The control unit 150 is a computer such as a CPU (central processing unit). The control unit 150 may be made up of one or a plurality of processors. The control unit 150 reads and executes the program (content switching application) stored in the storage unit 140 and thus implements various functions.

For example, if the communication unit 110 receives content information, the control unit 150 generates thumbnail image information using the content information. Therefore, the load on the projector 200 can be reduced, compared with the case where the projector 200 generates the thumbnail image information using the content information.

If the communication unit 110 receives a loading completion signal, the control unit 150 embeds the thumbnail image corresponding to the thumbnail image information into the thumbnail display image 101. In other words, if the communication unit 110 receives the content information and the loading completion signal, the control unit 150 causes the display unit 120 to execute the display of the thumbnail image corresponding to the thumbnail image information.

If the receiving unit 130 receives an operation on a thumbnail image, the control unit 150 causes the communication unit 110 to execute an operation to transmit a display notification corresponding to the operated thumbnail image, to the projector 200.

FIG. 3 shows an example of the projector 200. The projector 200 includes a communication unit 210, a frame memory 220, an image processing unit 230, a light valve drive unit 240, a light source drive unit 250, a projection device 260, a storage device 270, a control unit 280, and a bus 290. The projection device 260 includes a light source 261, three liquid crystal light valves 262 (262R, 262G, 262B), and a projection system 263.

To the projector 200, an external storage device 400 is connected via an interface, not illustrated. The external storage device 400 is, for example, a card-type recording medium such as an SD memory card, or a USB (Universal Serial Bus) memory device.

The external storage device 400 stores image information and content information for each of a plurality of content images. In other words, for each content image, the external storage device 400 stores image information representing the content image, and content information, in association with each other.

The communication unit 210, the frame memory 220, the image processing unit 230, the light valve drive unit 240, the light source drive unit 250, the storage device 270, the control unit 280, and the external storage device 400 can communicate with each other via the bus 290.

The communication unit 210 can communicate with the terminal device 100. For example, the communication unit 210 wirelessly communicates with the terminal device 100.

The frame memory 220 is an example of a storage unit. The frame memory 220 stores image information corresponding to a content image that is a display target. In this embodiment, the frame memory 220 stores image information corresponding to a content image that is a display target, of the image information stored in the external storage device 400.

In this embodiment, the frame memory 220 includes four frame buffers. Each frame buffer stores one piece of image information. Therefore, the frame memory 220 can simultaneously store four pieces of image information (for example, four pieces of image information corresponding one-on-one to the thumbnail images 10 to 40). The four pieces of image information are an example of a plurality of pieces of image information. Here, the number of pieces of image information and the number of frame buffers are not limited to four and may be any number equal to or greater than 2.

The image processing unit 230 performs image processing on the image information stored (loaded) in the frame memory 220. The image processing unit 230 outputs the image-processed image information to the light valve drive unit 240, as an image signal.

The light valve drive unit 240 drives the liquid crystal light valves 262 (262R, 262G, 262B), based on the image signal.

The light source drive unit 250 drives the light source 261. For example, the light source drive unit 250 causes the light source 261 to emit light if the projector 200 accepts a power-on operation.

The projection device 260 is an example of a display unit that is enabled to display the content image based on the image information stored in the frame memory 220, on the table surface 300a (an example of a display surface), if the frame memory 220 (an example of a storage unit) stores the image information.

The projection device 260 projects the content image (image light) onto the table surface 300a and thus displays the content image. In the projection device 260, the liquid crystal light valves 262 modulates the light emitted from the light source 261 and thus generate image light, and the projection system 263 projects the image light in an enlarged form onto the table surface 300a.

The light source 261 is a xenon lamp, ultra-high-pressure mercury lamp, LED (light emitting diode), or laser light source or the like. The light source 261 emits light. The light emitted from the light source 261 is reduced in luminance distribution variation by an optical integration system, not illustrated, and is subsequently split into color light components of red (R), green (G), and blue (B), which are the primary colors of light, by a color separation system, not illustrated. The R, G, B color light components become incident on the corresponding liquid crystal light valves 262R, 262G, 262B.

The liquid crystal light valves 262 modulate the light emitted from the light source 261 according to image information (image signal) and thus generate image light. Each liquid crystal light valve 262 is made up of a liquid crystal panel having a pair of transparent substrates with a liquid crystal enclosed between them, or the like. In the liquid crystal light valve 262, a rectangular pixel area 262a made up of a plurality of pixels 262p arranged in the form of a matrix is formed. In the liquid crystal light valve 262, a drive voltage can be applied to the liquid crystal at each pixel 262p.

When the light valve drive unit 240 applies a drive voltage corresponding to an image signal to each pixel 262p, each pixel 262p is set to a light transmittance corresponding to the image signal. Therefore, the light emitted from the light source 261 is transmitted through the pixel area 262a and thus modulated. Thus, an image corresponding to the image signal is formed for each color light. The images of the respective colors are combined together at each pixel 262p by a light combining system, not illustrated, and consequently form color image light.

The projection system 263 projects the image light generated by the liquid crystal light valves 262 in an enlarged form onto the table surface 300a.

The storage device 270 is a computer-readable recording medium. The storage device 270 stores a program which prescribes operations of the projector 200, and various kinds of information.

The control unit 280 is a computer such as a CPU. The control unit 280 may be made up of one or a plurality of processors. The control unit 280 reads and executes the program stored in the storage device 270 and thus implements various functions. The control unit 280 directly or indirectly controls the communication unit 210, the frame memory 220, and the projection device 260.

If, for example, the communication unit 210 receives a request signal from the terminal device 100, the control unit 280 causes the communication unit 210 to execute an operation to transmit content information requested by the request signal to the terminal device 100 and also causes the frame memory 220 to store image information corresponding to this content information.

After the frame memory 220 stores the image information, the control unit 280 causes the communication unit 210 to execute an operation to transmit a loading completion signal to the terminal device 100. In this embodiment, after the frame memory 220 stores the image information, the control unit 280 causes the image processing unit 230 to execute image processing on the image information on the frame memory 220. On completion of the image processing, the control unit 280 causes the communication unit 210 to execute the operation to transmit the loading completion signal to the terminal device 100. That is, the loading completion signal is transmitted to the terminal device 100 after the frame memory 220 stores the image-processed image information.

If the communication unit 210 receives a display notification, the control unit 280 causes the image processing unit 230 to execute an operation to output image information corresponding to a content image designated by the display notification from among the image information stored in the frame memory 220, as an image signal to the light valve drive unit 240.

Next, operations will be described.

Figure 4:
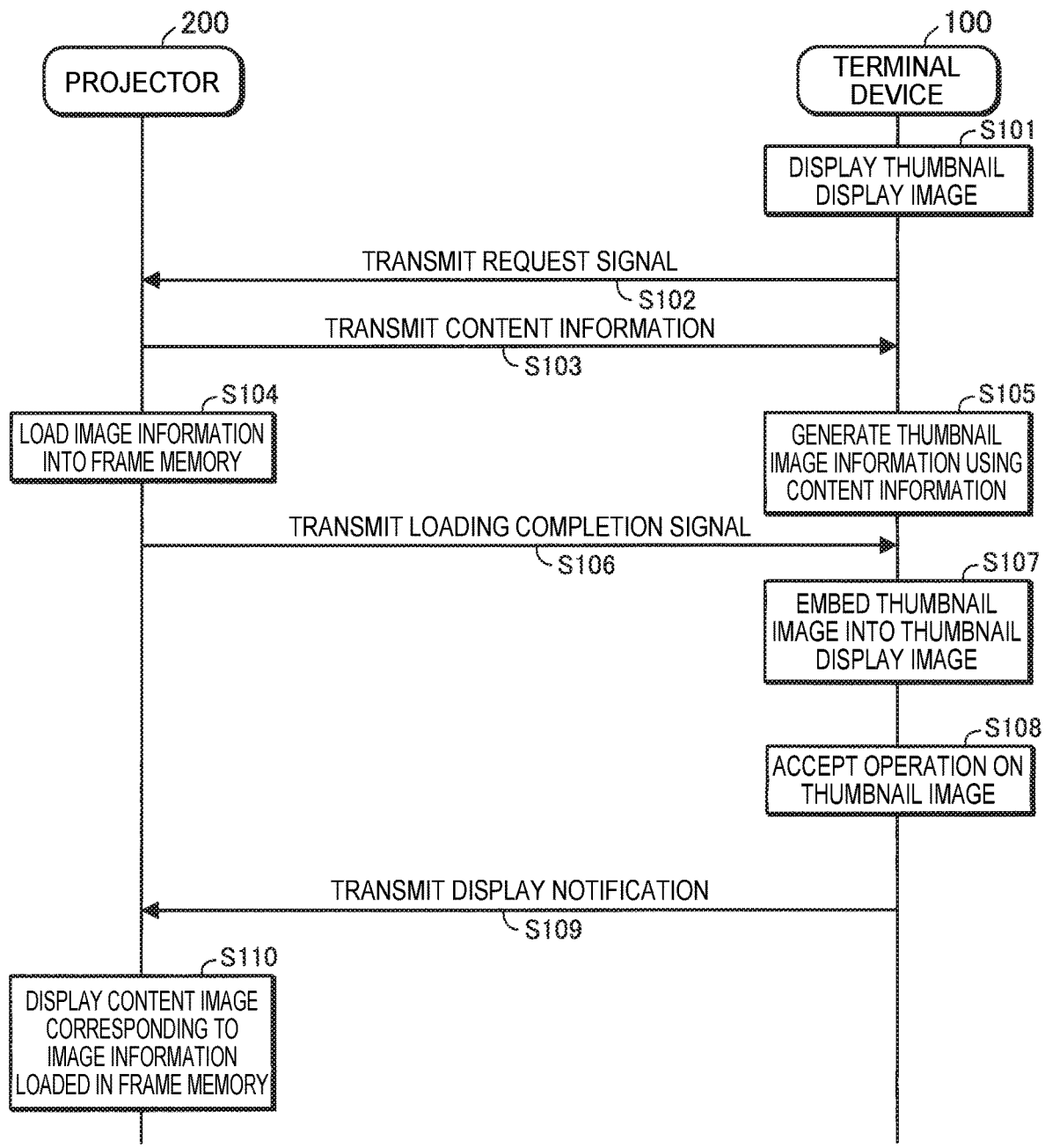
FIG. 4 is a sequence chart for explaining operations of the display system 1.

FIG. 4 is a sequence chart for explaining operations of the display system 1.

In the terminal device 100, the receiving unit 130 receives an operation to start up the content switching application, and the control unit 150 starts up the content switching application and causes the display unit 120 to display the thumbnail display image 101 (step S101).

In step S101, the terminal device 100 has not yet acquired content information to generate the thumbnail images 10 to 40. Therefore, none of the thumbnail images 10 to 40 is embedded in the thumbnail display image 101 displayed in step S101.

Figure 5:
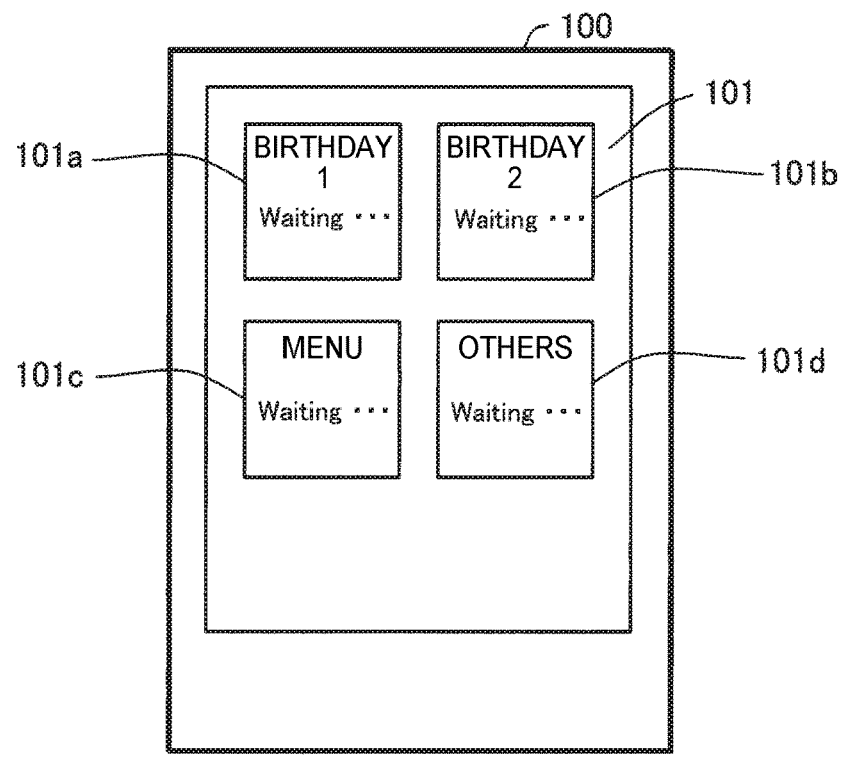
FIG. 5 shows an example of a thumbnail display image 101.

FIG. 5 shows an example of the thumbnail display image 101 displayed in step S101. In the thumbnail display image 101 shown in FIG. 5, the thumbnail image 10 is not yet embedded at an embedding position 101a for the thumbnail image 10. The embedding position 101a is an example of a predetermined position.

At the embedding position 101a, text information that univocally specifies the thumbnail image 10 (in the example of FIG. 5, "Birthday 1") and text information "Waiting . . . " to the effect that the thumbnail image 10 is scheduled to be acquired are displayed.

If the thumbnail image 10 is not present at the embedding position 101a, an operation (touch operation) on the embedding position 101a does not cause the control unit 150 to transmit a display notification from the communication unit 110 to the projector 200.

In the thumbnail display image 101 shown in FIG. 5, no thumbnail image is embedded at embedding positions 101b to 101d corresponding one-on-one to the thumbnail images 20 to 40, either. Text information is displayed also at the embedding positions 101b to 101d. If no thumbnail image is present at the embedding positions 101b to 101d, an operation (touch operation) on these embedding positions does not cause a request signal to be transmitted.

Next, the control unit 150 causes the communication unit 110 to transmit a request signal which requests a plurality of pieces of content information to generate the thumbnail images 10 to 40, to the projector 200 (step S102). The request signal may be transmitted to the projector 200 before the thumbnail display image 101 is displayed.

In the projector 200, the communication unit 210 receives the request signal, and the control unit 280 reads out the first to fourth content information from the external storage device 400.

Next, the control unit 280 causes the communication unit 210 to transmit the first to fourth content information to the terminal device 100 (step S103).

Next, the control unit 280 reads out four pieces of image information corresponding one-on-one to the thumbnail images 10 to 40 from the external storage device 400. The control unit 280 then loads the four pieces of image information corresponding one-on-one to the thumbnail images 10 to 40, one by one, into the four frame buffers of the frame memory 220 (step S104). In this embodiment, in step S104, the frame memory 220 stores the image information and subsequently the image processing unit 230 executes image processing on the image information on the frame memory 220.

In the terminal device 100, the communication unit 110 receives the first to fourth content information, and the control unit 150 begins to generate thumbnail image information for each of the thumbnail images 10 to 40, using the first to fourth content information (step S105). Although the control unit 150 generates the thumbnail image information, the control unit 150 does not execute the display of the thumbnail images represented by the thumbnail image information until a loading completion signal corresponding to the thumbnail image information is received from the projector 200.

In the projector 200, on completion of step S104, the control unit 280 causes the communication unit 210 to transmit a loading completion signal to the terminal device 100 (step S106).

In step S106, every time the frame memory 220 stores image information, and more specifically, every time the frame memory 220 stores image-processed image information, the control unit 280 causes the communication unit 210 to transmit a loading completion signal corresponding to the thumbnail image information associated with the image information, to the terminal device 100.

In other words, while the frame memory 220 is storing a plurality of pieces of image information, the control unit 280 causes the communication unit 210 to execute an operation to transmit a loading completion signal to the terminal device 100 with respect to image information stored in the frame memory 220, of the plurality of pieces of image information, even if there is image information that is not stored in the frame memory 220, of the plurality of pieces of image information.

In the terminal device 100, the communication unit 110 receives the loading completion signal, and the control unit 150 specifies the thumbnail image information corresponding to the loading completion signal. The control unit 150 then causes the display unit 120 to display the thumbnail display image 101 in which the thumbnail image corresponding to the specified thumbnail image information is embedded (step S107).

Figure 6:
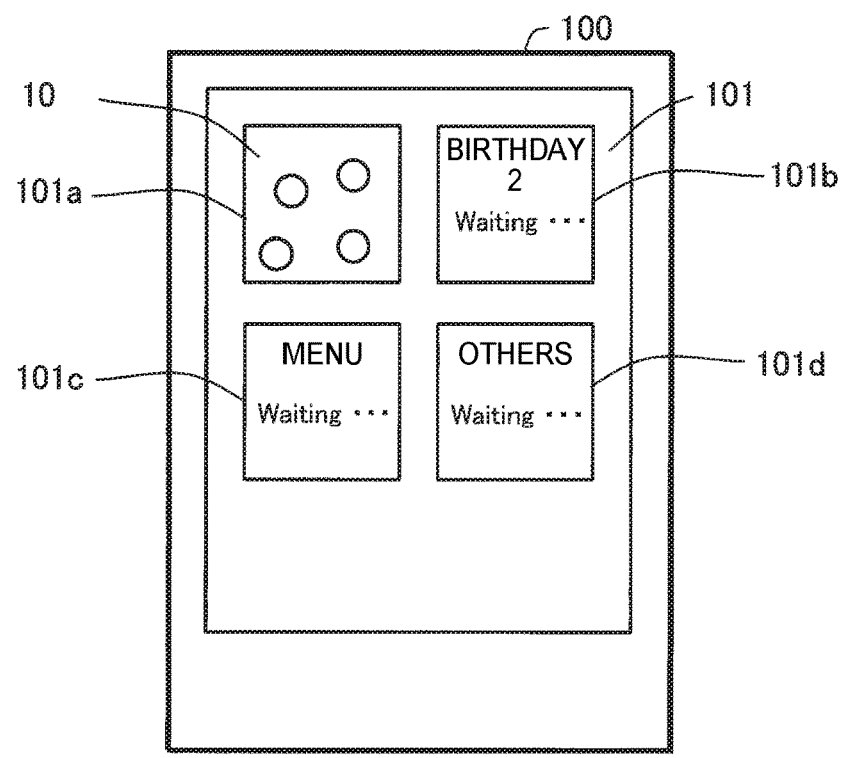
FIG. 6 shows another example of the thumbnail display image 101.

For example, if the communication unit 110 first receives a loading completion signal corresponding to the thumbnail image information representing the thumbnail image 10, the thumbnail image 10 is first embedded into the thumbnail display image 101, as shown in FIG. 6. At the point when a loading completion signal corresponding to the thumbnail image information representing the thumbnail images 20 to 40 is not received, the thumbnail display image 101 in which the thumbnail image 10 is embedded but the thumbnail images 20 to 40 are not embedded is displayed on the terminal device 100, as shown in FIG. 6. Subsequently, the other thumbnails are sequentially embedded into the thumbnail display image 101.

Subsequently, if the user of the terminal device 100 operates the thumbnail image 10 at the timing when a content image (image for birthday 10A) corresponding to the thumbnail image 10 should be displayed in a birthday event, the receiving unit 130 receives the operation on the thumbnail image 10 (step S108).

After the receiving unit 130 receives the operation on the thumbnail image 10, the control unit 150 causes the communication unit 110 to transmit a display notification to the effect that the content image corresponding to the thumbnail image 10 is to be displayed, to the projector 200 (step S109).

In the projector 200, the communication unit 210 accepts the display notification to the effect that the content image corresponding to the thumbnail image 10 is to be displayed. Then, the control unit 280 specifies image information corresponding to the content image designated by the display notification, of the image information stored in the frame memory 220.

Next, the control unit 280 causes the image processing unit 230 to execute an operation to output the specified image information to the light valve drive unit 240, as an image signal. The image processing unit 230 starts outputting the image signal to the light valve drive unit 240, and the projection device 260 projects a content image corresponding to the image signal onto the table surface 300a (step S110).

The display system 1, the projector 200, and the method for controlling the projector 200 according to this embodiment enable the terminal device 100 to accept an operation to give an instruction to display an image, that is, an operation on a thumbnail image, after the frame memory 220 stores image information and the projection device 260 is enabled to display an image based on the image information, on the table surface 300a.

Therefore, the time taken to complete a display corresponding a display notification after the projector 200 receives the display notification (instruction) from the terminal device 100 can be made shorter than in a configuration where an image based on image information is displayed on the table surface 300a after the frame memory 220 stores the image information, following the acceptance of the operation by the terminal device 100. Thus, the projector 200 can immediately perform a display in response to an operation on the terminal device 100.

If it takes long time until the projector 200 starts a display after the user of the terminal device 100 operates a thumbnail image, the user of the terminal device 100 may misunderstand and think that the terminal device 100 has not accepted the operation on the thumbnail image, and may repeat the same operation again and again during a short period of time. If the same operation is repeated during a short period of time, the same content image is displayed again and again during a short period of time and this causes deterioration in display quality.

In this embodiment, the time taken until the projector 200 starts a display after the user of the terminal device 100 operates a thumbnail image can be reduced. Therefore, the user of the terminal device 100 is less likely to misunderstand and think that the terminal device 100 has not accepted the operation on the thumbnail image. This makes it possible to restrain deterioration in display quality due to repeated display of the same content image.

The user of the terminal device 100 views a thumbnail image on the terminal device 100 and thus checks an image to be projected by the projector 200, and subsequently causes the projector 200 to project the image. Therefore, the possibility the user of the terminal device 100 may cause the projector 200 to project an unintended image can be reduced. Thus, it is possible to restrain reduction in the presentation effect for the event due to the projection of an image that is not intended by the user of the terminal device 100.

If the communication unit 210 receives a request signal for a plurality of pieces of image information from the terminal device 100, the control unit 280 causes the communication unit 210 to execute an operation to transmit content information for the plurality of pieces of image information to the terminal device 100 and also causes the frame memory 220 to store the plurality of pieces of image information.

Therefore, in the state where a thumbnail image corresponding to a content image that is a display target is selected from a plurality of thumbnail images, the time taken to complete the display of the content image that is a display target after the projector 200 receives a display notification can be reduced.

While the frame memory 220 is storing a plurality of pieces of image information, the control unit 280 causes the communication unit 210 to execute an operation to transmit a loading completion signal to the terminal device 100 with respect to image information stored in the frame memory 220, of the plurality of pieces of image information, even if there is image information that is not stored in the frame memory 220, of the plurality of pieces of image information.

This enables acceptance of an operation to give an instruction to display a content image with respect to content images that are enabled to be displayed, even if not all of the plurality of content images are enabled to be displayed.

The terminal device 100 transmits a display notification to the projector 200 if the embedding position 101a is operated in the state where the display of the thumbnail image 10 is executed at the embedding position 101a. Meanwhile, the terminal device 100 does not transmit a display notification to the projector 200 if the embedding position 101a is operated in the state where the display of the thumbnail image 10 is not executed at the embedding position 101a.

Therefore, the transmission of a display notification can be restrained with respect to a content image with its corresponding thumbnail image not displayed, that is, a content image that is not enabled to be displayed because its image information is not stored in the frame memory 220.

If the communication unit 210 receives a request signal, the control unit 280 acquires image information from the external storage device 400 and causes the frame memory 220 to store the image information acquired from the external storage device 400.

Therefore, the image corresponding to the image information stored in the external storage device 400 can be displayed on the table surface 300a.

Modifications

The invention is not limited to the foregoing embodiment. For example, the following various modifications can be made. Also, one or a plurality of modifications arbitrarily selected from the following modifications can be properly combined.

Modification 1

The terminal device 100 automatically acquires content information from the projector 200. However, the terminal device 100 may acquire content information in response to an operation by the user. For example, if one of the embedding positions is operated (with a touch operation) in the state where the thumbnail display image 101 shown in FIG. 5 is displayed, the control unit 150 of the terminal device 100 acquires the content information corresponding to the operated embedding position from the projector 200, using a request signal.

Modification 2

A content image may be an image made up of a plurality of images superimposed on each other. In this case, the image information corresponding to the content image includes, for example, base image information representing abase image, and presentation effect image information representing a presentation effect image which adds a presentation effect to the base image.

Figure 7:
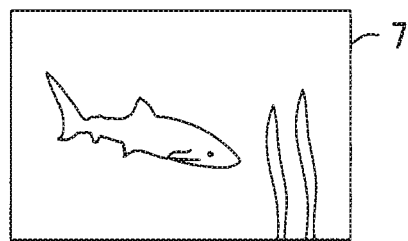
FIG. 7 shows an example of a base image 7.
Figure 8:
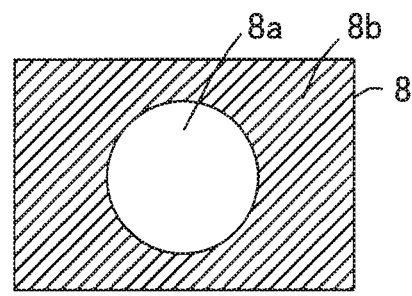
FIG. 8 shows an example of a presentation effect image 8.
Figure 9:
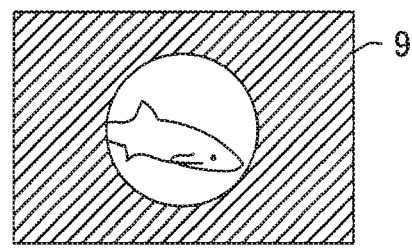
FIG. 9 shows a composite image 9.

FIG. 7 shows an example of a base image 7. The base image 7 shows a shark or the like. FIG. 8 shows an example of a presentation effect image 8. The presentation effect image 8 includes a transparent area 8a and a black area 8b. FIG. 9 shows a composite image 9 made up of the base image 7 and the presentation effect image 8 superimposed on each other. Here, the base image 7 is not limited to the image shown in FIG. 7 and can be changed suitably. The presentation effect image 8 is not limited to the image shown in FIG. 8 and can be changed suitably. For example, an image including a polygonal transparent area at a top right part, or an image that blurs the base image may be used as a presentation effect image. The number of images superimposed is not limited to two and may be three or more.

If the image information is made up of a combination of base image information and presentation effect image information, information including base content information, which is the base image information with reduced resolution, and presentation effect content information, which is the presentation effect image information with reduced resolution, may be used as content information. In this case, the terminal device 100 superimposes the base content information and the presentation effect content information to generate thumbnail image information, and displays a thumbnail image corresponding to the thumbnail image information.

If the image information is made up of a combination of base image information and presentation effect image information, the image processing unit 230 executes image processing to superimpose the base image information and the presentation effect image information in step S104. Therefore, on completion of step S104, the image information made up of the base image information and the presentation effect image information superimposed on each other is stored in the frame memory 220.

If the base image is a dynamic image, still image information representing one of the still images forming the dynamic image may be used as base image content information.

Modification 3

The content information may be switched according to the communication speed between the terminal device 100 and the projector 200 (hereinafter simply referred to as "communication speed").

For example, if the communication speed is equal to or higher than a reference value when the content image is a dynamic image, still image information representing one of the still images forming the dynamic image is used as the content information. Meanwhile, if the communication speed is less than the reference value when the content image is a dynamic image, and if the terminal device 100 has the content image, information specifying the content image (for example, the file name of the content image) is used as the content information.

Modification 4

If the thumbnail display image 101 has a plurality of pages, every time the page of the thumbnail display image 101 displayed on the terminal device 100 is changed, the control unit 150 may cause the communication unit 110 to execute an operation to acquire content information to generate a thumbnail image embedded in the changed page.

Modification 5

The display corresponding to content information (an example of first information) is not limited to the display of a thumbnail image of the content image corresponding to the content information and may be the display of any image that can identify the content image.

Modification 6

Image information and content information may be stored in the storage device 270 instead of the external storage device 400. In this case, the storage device 270 stores image information representing a content image, and content information, in association with each other for each content image.

Modification 7

The image projected by the projector 200 is not limited to an image for presentation effect and can be changed suitably. For example, the image projected by the projector 200 may be a simple white image that can be used as illumination light.

Modification 8

The number of thumbnail images displayed simultaneously on the terminal device 100 is not limited to four and may be any number equal to one or more.

Modification 9

The place where the display system 1 is used is not limited to a restaurant and can be changed suitably. For example, if the projector 200 projects an image to be cast on a product, the display system 1 may be used at a store that sells the product.

Modification 10

While the liquid crystal light valves 262 are used as the light modulation unit, the light modulation unit is not limited to the liquid crystal light valves 262 and can be changed suitably. For example, the light modulation unit may be configured using three reflection-type liquid crystal panels. The light modulation unit may be configured using a single liquid crystal panel, three digital mirror devices (DMDs), or a single digital mirror device. If a single liquid crystal panel or DMD is used as the light modulation unit, components equivalent to the color separation system and the light combining system are not needed. Other than the liquid crystal panel and DMD, any configuration that can modulate the light emitted from the light source can be employed as the light modulation unit.

Modification 11

All or a part of the elements implemented by the control unit 150 or 280 reading and executing a program may be implemented by hardware including an electronic circuit such as FPGA (field programmable gate array) or ASIC (application specific IC), or may be implemented by the collaboration of software and hardware.

Modification 12

While the projection device 260 is used as the display unit, the display unit may be a direct-view display having a display surface.

What is claimed is:
1. A display system comprising an information processing device and a display device which communicates with the information processing device,
the display device comprising:
a communication unit which communicates with the information processing device;
a storage unit;

a display unit which is enabled to display an image based on image information, on a display surface, when the storage unit stores the image information; and a control unit which controls the communication unit, the storage unit, and the display unit, wherein the information processing device transmits a first signal which requests first information used to give an instruction to display the image, to the display device, the control unit causes the communication unit to execute an operation to transmit the first information to the information processing device and also causes the storage unit to store the image information, when the communication unit receives the first signal, the control unit causes the communication unit to execute an operation to transmit a second signal which prompts a display corresponding to the first information, to the information processing device, after the storage unit stores the image information, the information processing device executes the display corresponding to the first information when the information processing device receives the first information and the second signal, the information processing device transmits a third signal which gives an instruction to display the image, to the display device, in response to an operation on the display corresponding to the first information, and the control unit causes the display unit to execute an operation to display the image on the display surface when the communication unit receives the third signal.

2. The display system according to claim 1, wherein the image information is one of a plurality of pieces of image information, and the control unit causes the communication unit to execute the operation to transmit the first information to the information processing device with respect to the plurality of pieces of image information and also causes the storage unit to store the plurality of pieces of image information, when the communication unit receives the first signal for the plurality of pieces of image information from the information processing device.

3. The display system according to claim 2, wherein the control unit causes the communication unit to execute the operation to transmit the second signal to the information processing device with respect to image information stored in the storage unit, of the plurality of pieces of image information, even when there is image information that is not stored in the storage unit, of the plurality of pieces of image information, while the plurality of pieces of image information is being stored in the storage unit.

4. The display system according to claim 1, wherein the information processing device transmits the third signal to the display device when a predetermined position is operated in the state where the display corresponding to the first information is executed at the predetermined position, and the information processing device does not transmit the third signal to the display device when the predetermined position is operated in the state where the display corresponding to the first information is not executed at the predetermined position.

5. The display system according to claim 1, wherein the control unit acquires the image information from an external storage device and causes the storage unit to store the image information acquired from the external storage device, when the communication unit receives the first signal.

6. The display system according to claim 1, wherein the information processing device executes a display of a thumbnail image corresponding to the first information when the information processing device receives the second signal.

7. A display device comprising:

a communication unit which communicates with an information processing device;

a storage unit;

a display unit which is enabled to display an image based on image information, on a display surface, when the storage unit stores the image information; and a control unit which controls the communication unit, the storage unit, and the display unit, wherein the control unit causes the communication unit to execute an operation to transmit first information used to give an instruction to display the image, to the information processing device, and also causes the storage unit to store the image information, when the communication unit receives a first signal which requests the first information from the information processing device, causes the communication unit to execute an operation to transmit a second signal which prompts a display corresponding to the first information to the information processing device, after the storage unit stores the image information, and causes the display unit to execute an operation to display the image on the display surface when the communication unit receives a third signal which gives an instruction to display the image transmitted from the information processing device in response to an operation on the display corresponding to the first information.

8. The display device according to claim 7, wherein the image information is one of a plurality of pieces of image information, and the control unit causes the communication unit to execute the operation to transmit the first information to the information processing device with respect to the plurality of pieces of image information and also causes the storage unit to store the plurality of pieces of image information, when the communication unit receives the first signal for the plurality of pieces of image information from the information processing device.

9. The display device according to claim 8, wherein the control unit causes the communication unit to execute the operation to transmit the second signal to the information processing device with respect to image information stored in the storage unit, of the plurality of pieces of image information, even when there is image information that is not stored in the storage unit, of the plurality of pieces of image information, while the plurality of pieces of image information is being stored in the storage unit.

10. The display device according to claim 7, wherein the information processing device transmits the third signal to the display device when a predetermined position is operated in the state where the display corresponding to the first information is executed at the predetermined position, and the information processing device does not transmit the third signal to the display device when the predetermined position is operated in the state where the display corresponding to the first information is not executed at the predetermined position.

11. The display device according to claim 7, wherein the control unit acquires the image information from an external storage device and causes the storage unit to store the image information acquired from the external storage device, when the communication unit receives the first signal.

12. A method for controlling a display device which has a storage unit and which is enabled to display an image based on image information, on a display surface, when the storage unit stores the image information, the method comprising:

when a first signal which requests first information used to give an instruction to display the image is received from an information processing device, transmitting the first information to the information processing device and causing the storage unit to store the image information;

transmitting a second signal which prompts a display corresponding to the first information to the information processing device, after the storage unit stores the image information; and displaying the image on the display surface when a third signal which gives an instruction to display the image transmitted from the information processing device in response to an operation on the display corresponding to the first information is received.

13. The method for controlling the display device according to claim 12, wherein the image information is one of a plurality of pieces of image information, and the first information is transmitted to the information processing device with respect to the plurality of pieces of image information and the plurality of pieces of image information is stored in the storage unit, when the first signal for the plurality of pieces of image information is received from the information processing device.

14. The method for controlling the display device according to claim 13, wherein the second signal is transmitted to the information processing device with respect to image information stored in the storage unit, of the plurality of pieces of image information, even when there is image information that is not stored in the storage unit, of the plurality of pieces of image information, while the plurality of pieces of image information is being stored in the storage unit.

15. The method for controlling the display device according to claim 12, wherein the image information is acquired from an external storage device and the image information acquired from the external storage device is stored in the storage unit, when the first signal is received.

* * * * *